United States Patent
Parthasarathy et al.

(10) Patent No.: US 11,486,211 B2
(45) Date of Patent: Nov. 1, 2022

(54) WELL CONTROL SYSTEM HAVING ONE OR MORE ADJUSTABLE ORIFICE CHOKE VALVES AND METHOD

(71) Applicant: ADS Services LLC, Midland, TX (US)

(72) Inventors: Anand Parthasarathy, Cypress, TX (US); Scott Charles, Houston, TX (US)

(73) Assignee: ADS Services LLC, Midland, TX (US)

( * ) Notice: Subject to any disclaimer, the term of this patent is extended or adjusted under 35 U.S.C. 154(b) by 0 days.

(21) Appl. No.: 17/336,293

(22) Filed: Jun. 1, 2021

(65) Prior Publication Data

US 2021/0355772 A1    Nov. 18, 2021

Related U.S. Application Data

(63) Continuation of application No. 16/235,568, filed on Dec. 28, 2018, now Pat. No. 11,021,918.

(51) Int. Cl.
*E21B 21/08* (2006.01)
*E21B 21/10* (2006.01)

(52) U.S. Cl.
CPC ............ *E21B 21/08* (2013.01); *E21B 21/106* (2013.01); *G05B 2219/45129* (2013.01)

(58) Field of Classification Search
CPC ........ E21B 21/08; E21B 21/106; E21B 21/10; E21B 43/16; G05B 2219/45129
See application file for complete search history.

(56) References Cited

U.S. PATENT DOCUMENTS

| | | |
|---|---|---|
| 9,995,098 B2 | 6/2018 | Brana et al. |
| 2004/0144565 A1 | 7/2004 | Koederitz |
| 2005/0092523 A1 | 5/2005 | McCaskill et al. |
| 2005/0222772 A1 | 10/2005 | Koederitz et al. |
| 2012/0330466 A1 | 12/2012 | Rodger |
| 2013/0300568 A1 | 11/2013 | Mathena et al. |
| 2015/0240579 A1 | 8/2015 | Lovorn et al. |
| 2016/0076322 A1 | 3/2016 | Oddie et al. |
| 2017/0226813 A1 | 8/2017 | Northam et al. |
| 2017/0328151 A1 | 11/2017 | Dillard et al. |
| 2018/0328127 A1 | 11/2018 | Ravi et al. |

FOREIGN PATENT DOCUMENTS

WO    2014183136 A1    11/2014

OTHER PUBLICATIONS

International search report for related application PCT/US2019/068668; Simin Baharlou; dated Jun. 16, 2021.

(Continued)

*Primary Examiner* — Christopher E. Everett

(57) ABSTRACT

A well drilling system is provided that includes a choke manifold and a controller. The choke manifold includes at least one choke valve. The choke valve is actuable between fully open and closed choke positions. The choke valve has a Cv value for each choke position. The controller is in communication with the choke valve and a non-transitory memory storing instructions. The instructions relate Cv values to choke positions for the choke valve. The instructions when executed cause the controller to: a) determine a difference in pressure ($\Delta P$); b) input or determine a density value; c) input or determine a Q value; d) determine a first Cv value using the $\Delta P$, the density value, and the Q value; and e) actuate the choke valve to a first choke position associated with the first Cv value.

7 Claims, 3 Drawing Sheets

(56) References Cited

OTHER PUBLICATIONS

UK Patent Office; Examination Report for Related Application No. 2109559.1; dated May 5, 2022; Dr. Michael Gooch; 2 pages.
Fossli, "Managed Pressure Drilling; Techniques and Options for Improving Efficiency, Operability and Well Safety in Subsea TTRD", Offshore Technology Conference, May 1, 2006.
International search report for PCT/US2019/068668 dated Mar. 19, 2020.
Midtun, "Rig Integrated Managed Pressure Drilling", University of Stavanger Master's Thesis, Jun. 5, 2015.
Totland, "Fast Pressure Control in Managed Pressure Drilling", Norwegian University of Science and Technology Master's Thesis, Jun. 2014.

WELL CONTROL SYSTEM HAVING ONE OR MORE ADJUSTABLE ORIFICE CHOKE VALVES AND METHOD

CROSS-REFERENCE TO RELATED APPLICATIONS

This application is a continuation of U.S. patent application Ser. No. 16/235,568, filed Dec. 28, 2018, entitled WELL CONTROL SYSTEM HAVING ONE OR MORE ADJUSTABLE ORIFICE CHOKE VALVES AND METHOD, which issued as U.S. Pat. No. 11,021,918 on Jun. 1, 2021, the specification of which are incorporated by reference herein in its entirety.

TECHNICAL FIELD

The present disclosure relates to well control systems in general, and to well control systems having adjustable orifice choke valves in particular.

BACKGROUND

To produce oil and gas from a subterranean reservoir, a drilling operation is managed using drives, pumps and other equipment. A drillstring with the drill bit rotates and penetrates a formation (e.g., a seabed) by cutting rock formations, creating the well. While drilling, "mud" is pumped into the drillstring to the bottom of the well and returned through an annulus surrounding the drillstring. One of the main challenges related to drilling is to maintain the pressure in the well within certain pressure boundaries. These pressure boundaries (which collectively define a pressure window) are determined by the fracture pressure ("$P_F$"; i.e., the amount of pressure a formation can withstand before it fails or splits) and the pore pressure ("$P_P$"; i.e., the pressure exerted by fluids disposed within the pores of the formation). If the fluid pressure in the well (e.g., the bottom hole pressure, or "BHP") increases above the fracture pressure (BHP>$P_F$), drilling mud may leak into the formation, causing fractions in the formation rock surrounding the well. If the pressure within the well drops below the pore pressure (BHP<$P_P$), fluids and sediments may enter the well from the formation. Without sufficient control of the pressure in the well, a blowout could potentially occur, releasing uncontrolled oil and gas to the surface.

Managed Pressure Drilling (MPD) is a technology for controlling the annular fluid pressure within the well during drilling. In MPD controlled wells, the annular fluid pressure (e.g., the BHP) is typically defined as the sum of hydrostatic pressure ("$P_H$"), the annulus frictional pressure ("$P_A$"), and the back pressure ("$P_{BP}$"); (i.e., BHP=$P_H$+$P_A$+$P_{BP}$). Similar to conventional drilling practices, MPD is designed to control the well pressure between the pore pressure and the fracture pressure (i.e., $P_P$<BHP<$P_F$). By manipulating topside located chokes and pumps, MPD provides an improved means (relative to conventional drilling control techniques) of establishing well pressure and counteracting pressure disturbances that may occur.

The ability to quickly respond to a pressure variation in BHP is a key aspect of any MPD system. In many prior art MPD systems, one or more control valves (sometimes referred to as a "choke" or a "choke valve"; hereinafter referred to as a "choke") are utilized as an element to control pressure. Some chokes are fixed orifice and others are variable orifice. A variable orifice choke (i.e., an adjustable choke) may be actuated in a continuum of different states, from a fully open state (100% open) to a fully closed state (0% open), and a plurality of open states there between (e.g., 10% open, 20% open, 30% open, etc.). More specifically, a variable orifice choke typically includes a stationary member (e.g., a seat) and a translating member (a gate). Movement of the translating member relative to the stationary member varies the state of the choke (% open), either closing the choke or opening the choke. During operation, some prior art adjustable chokes are controlled using an iterative process, wherein the translating member of the choke is iteratively translated to change the pressure across the choke; e.g., move the translating member some amount relative to the stationary member, and then determine the change in pressure, and repeat the process as required. Iterative choke systems of this type are functional, but typically have a relatively slow response.

What is needed is an improved well drilling system that is an improvement over the prior art.

SUMMARY

According to an aspect of the present disclosure, a well drilling system is provided that includes a choke manifold and a controller. The choke manifold includes at least one choke valve. The choke valve is actuable in a fully open choke position and a closed choke position, and a plurality of different choke positions there between. The choke valve has a flow coefficient value (Cv) for each choke position. The controller is in communication with the at least one choke valve and a non-transitory memory storing instructions. The instructions relate Cv values to choke positions for the choke valve. The instructions when executed cause the controller to: a) determine a difference in pressure ($\Delta P$) between a set point annular pressure and a second fluid pressure at a position downstream of the choke manifold; b) input or determine a value representative of the density of the drilling fluid; c) input or determine a value representative of a volumetric fluid flow (Q) through the choke valve; d) determine a first Cv value using the $\Delta P$, the value representative of the density of the drilling fluid, and the value representative of a volumetric fluid flow; and e) actuate the choke valve to a first choke position associated with the first Cv value.

According to another aspect of the present disclosure, a method for controlling annular fluid pressure of a drilling fluid within a well is provided. The method includes the steps of: (a) providing a choke manifold including at least one choke valve, the choke valve actuable in a fully open choke position and a closed choke position, and a plurality of different choke positions there between, wherein the at least one choke valve has a flow coefficient value (Cv) for each choke position, and a controller in communication with the at least one choke valve, the controller including stored instructions relating Cv values to choke positions for the at least one choke valve; (b) using the controller to determine a difference in pressure ($\Delta P$) between a set point annular pressure and a second fluid pressure at a position downstream of the choke manifold; (c) inputting or determining a value representative of the density of the drilling fluid; (d) inputting or determining a value representative of a volumetric fluid flow (Q) through the choke valve; (e) using the controller to determine a first Cv value using the $\Delta P$, the value representative of the density of the drilling fluid, and the value representative of a volumetric fluid flow; and (f) actuating the at least one choke valve to a first choke position associated with the first Cv value.

According to another aspect of the present disclosure, a non-transitory computer readable medium is provided. The computer readable medium includes software code sections which are adapted to perform a method for controlling annular fluid pressure of a drilling fluid within a well drilling system that includes a choke manifold including at least one choke valve, the choke valve actuable in a fully open choke position and a closed choke position, and a plurality of different choke positions there between, wherein the at least one choke valve has a flow coefficient value (Cv) for each choke position, and a controller in communication with the at least one choke valve, wherein the drilling fluid has a density. The computer readable medium includes instructions relating Cv values to choke positions for the at least one choke valve, and the method includes the steps of: a) using the controller to determine a difference in pressure (ΔP) between a set point annular pressure and a second fluid pressure at a position downstream of the choke manifold; b) receiving an input value representative of the density of the drilling fluid, or determining the same; c) receiving an input value representative of a volumetric fluid flow (Q) through the choke valve, or determining the same; d) determining a first Cv value using the ΔP, the value representative of the density of the drilling fluid, and the value representative of a volumetric fluid flow; and e) actuating the at least one choke valve to a first choke position associated with the first Cv value.

In any of the aspects or embodiments described above and herein, the instructions relating Cv values to choke positions may include at least one of one or more mathematical functions or a lookup table.

In any of the aspects or embodiments described above and herein, the Q value may be based on input to the controller from at least one of a volumetric fluid flow output from a pump, or signals from at least one flow meter, or some combination thereof.

In any of the aspects or embodiments described above and herein, the value representative of the density of the drilling fluid may be a specific gravity value (SG) of the drilling fluid, and the SG value may be based on input to the controller from an operator, or based on input to the controller from one or more devices sensing the drilling fluid.

In any of the aspects or embodiments described above and herein, the choke manifold may include a first choke valve and a second choke valve, and the instructions may include a first set of instructions relating Cv value to choke position for the first choke valve, and a second set of instructions relating Cv value to choke position for the second choke valve. The instructions to determine the first Cv value using the ΔP may utilize the first set of instructions and the first Cv value is for the first choke valve, and the instructions may further include causing the controller to determine a second Cv value for the second choke valve.

In any of the aspects or embodiments described above and herein, the instructions to actuate the choke valve to the first choke position associated with the first Cv value, may include actuating the first choke valve to said first choke position of the first choke valve, and actuating the second choke valve to a second choke position of the second choke valve.

In any of the aspects or embodiments described above and herein, the instructions when executed may cause the controller to continuously actuate the choke valve to the first choke position from a second choke position.

In any of the aspects or embodiments described above and herein, the first set of instructions may include a first subset of Cv values and associated choke positions, and a second subset of Cv values and associated choke positions, wherein the first subset has a first sensitivity, and the second subset has a second sensitivity that is greater than the first sensitivity, and wherein the first Cv value is within the first subset of Cv values.

In any of the aspects or embodiments described above and herein, the step of actuating the at least one choke valve to the first choke position associated with the first Cv value, includes actuating the first choke valve to said first choke position of the first choke valve, and actuating the second choke valve to a second choke position of the second choke valve.

In any of the aspects or embodiments described above and herein, the choke manifold includes a first choke valve and a second choke valve, and wherein the instructions include a first set of instructions relating Cv value to choke position for the first choke valve, and a second set of instructions relating Cv value to choke position for the second choke valve, and the steps (b)-(f) of the method are performed for the first choke valve.

In any of the aspects or embodiments described above and herein, the steps (b)-(f) of the method are also performed for the second choke valve using the second set of instructions in place of the first set of instructions.

In any of the aspects or embodiments described above and herein, the instructions relating Cv values to choke positions for the at least one choke valve may include a first set of Cv values and associated choke positions, and a second set of Cv values and associated choke positions, wherein the first set has a first sensitivity, and the second set has a second sensitivity that is greater than the first sensitivity, wherein the first Cv value is within the first set of Cv values.

In any of the aspects or embodiments described above and herein, wherein the step of actuating the at least one choke valve may include actuating the choke valve at a first speed and a second speed, wherein the first speed is greater than the second speed.

In any of the aspects or embodiments described above and herein, the step of actuating the at least one choke valve may include continuously actuating the choke valve to the first choke position from a second choke position.

DETAILED DESCRIPTION

Figure 1A:
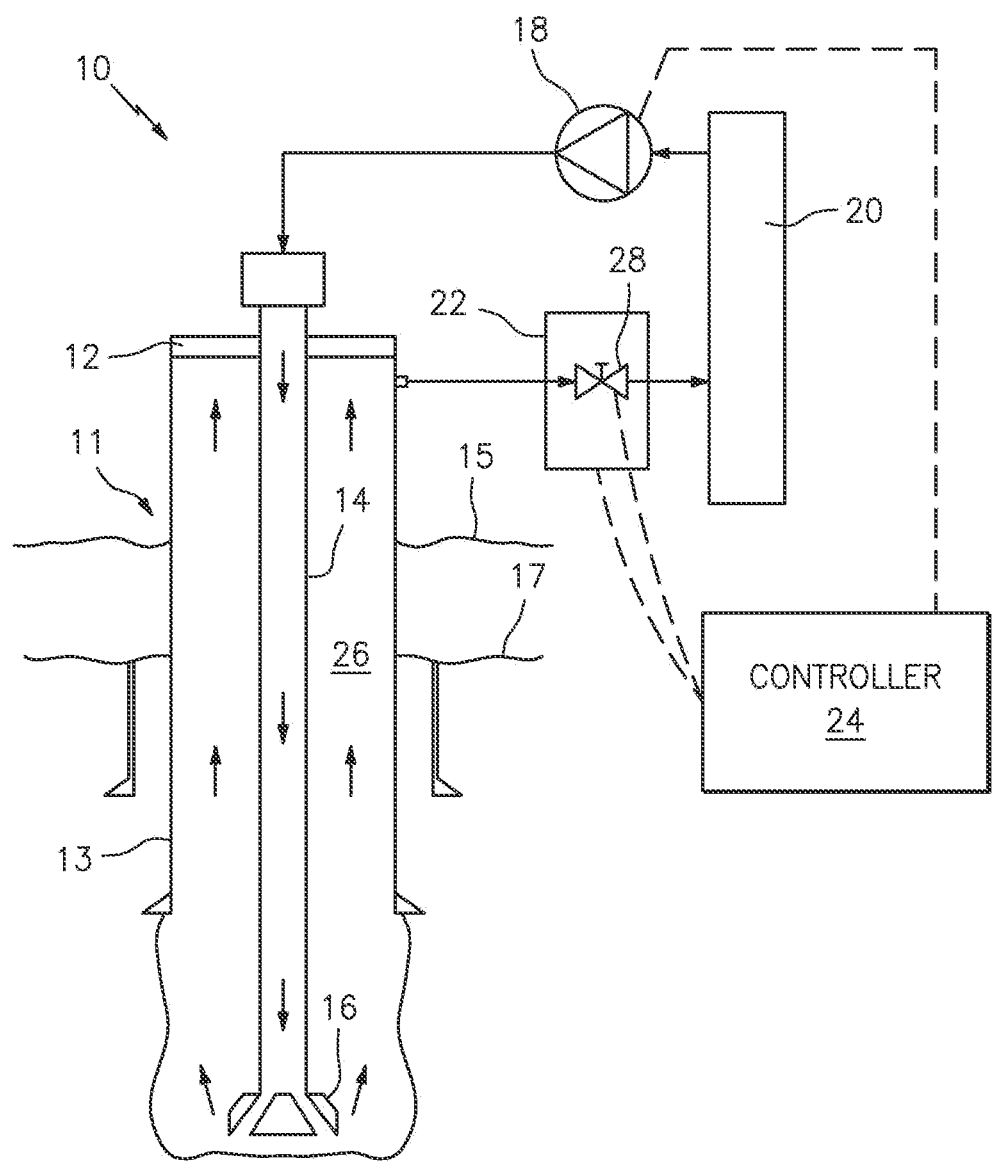
FIG. 1A is a diagrammatic view of a well drilling system according to an embodiment of the present disclosure.
Figure 1B:
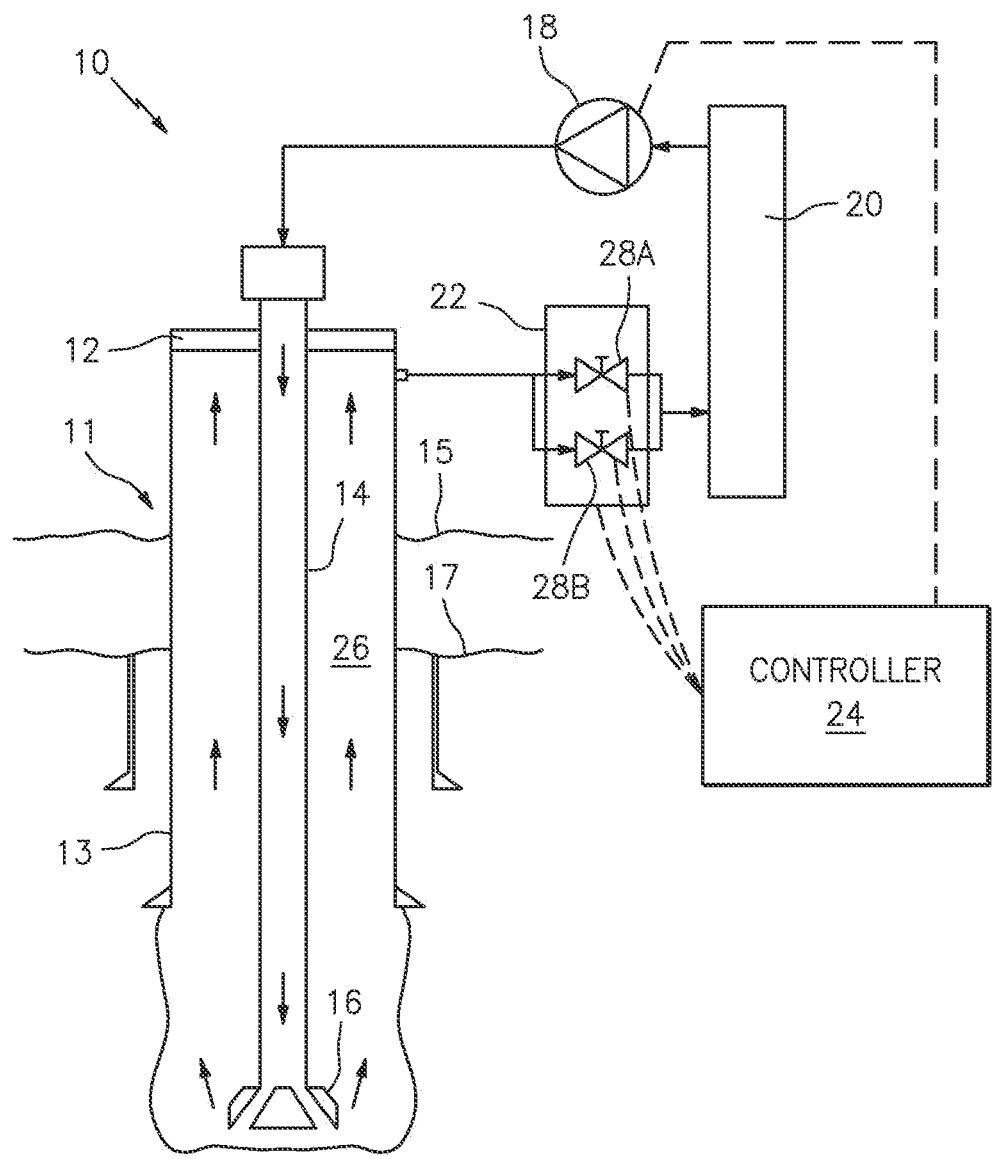
FIG. 1B is a diagrammatic view of a well drilling system according to an embodiment of the present disclosure.

Aspects of the present disclosure relate to the arrangement and control of choke valves deployed in a well drilling system. The present disclosure may be utilized with a variety of different well drilling systems and is not, therefore, limited to any particular well drilling system. FIGS. 1A and 1B diagrammatically illustrate non-limiting examples of a well drilling system 10 associated with a well 11 having a casing 13. In the example shown in FIGS. 1A and 1B, the well 11 is illustrated as a subsea well; e.g., the casing 13 extends from above a sea level 15 to below a sea bed 17. The present disclosure is not limited to use with subsea wells.

The well drilling systems 10 according to embodiments of the present disclosure include a choke manifold 22 and a controller 24. In the embodiments shown in FIGS. 1A and 1B, the well drilling systems further include a rotating control device ("RCD") 12, a drillstring 14 having a drill bit 16, a mud pump 18, and a mud tank 20. An annulus 26 is formed between the casing 13 and the drillstring 14. FIGS. 1A and 1B are diagrammatically shown to illustrate well drilling system embodiments. A person having skill in the art will recognize that a well drilling system can be a complex system. The well drilling systems 10 shown in FIGS. 1A and 1B are provided herein to facilitate the description, and for that purpose do not show all of the systems that may be utilized within a well drilling system.

In the embodiment shown in FIG. 1A, the choke manifold 22 includes a single choke valve 28, whereas in the embodiment shown in FIG. 1B, the choke manifold 22 includes a plurality of choke valves 28 (e.g., a first choke valve 28A and a second choke valve 28B). The present disclosure is applicable to a well drilling system 10 having a choke manifold 22 having a single choke valve 28 (e.g., FIG. 1A), or two choke valves 28A, 28B (e.g., FIG. 1B), or a choke manifold 22 having more than two choke valves 28. Each of the choke valves 28 is an adjustable orifice choke valve that is actuable between a first position (e.g., at "X" % open) to a second position (e.g., at "Y" % open), where the first position is different from the second position. Each choke valve 28 typically includes a valve portion in fluid communication with a fluid inlet and a fluid outlet; e.g., fluid enters the choke valve 28 through the fluid inlet, passes through the valve portion, and exits through the fluid outlet. Each choke valve 28 includes a motor (e.g., an electric motor) and may include a mechanical system (e.g., a gearbox, a worm gear drive, etc.) to translate drive motion of the motor to the actuation motion (e.g., linear translation) of the valve portion of the choke valve 28. For example, the valve portion of a choke valve 28 may be coupled to an output shaft of a worm gear drive, and the input shaft of the worm gear drive may be coupled to a gearbox, and the gearbox may connected to the motor. The motor drives the gearbox, which in turn drives the worm gear, which in turn drives a translatable portion of the valve portion of the choke valve 28. The present disclosure is not, however, limited to any particular type of adjustable orifice choke valve, or any particular choke valve/motor/mechanical system configuration. U.S. Pat. No. 6,883,614, which is hereby incorporated by reference, describes a non-limiting acceptable example of an adjustable orifice choke valve that may be used.

Each choke valve 28 may be defined in terms of parameters of the fluid flow passing through the choke valve 28. The relationship between the volumetric fluid flow ("Q") through a choke valve 28, a difference in pressure across the choke valve 28 ("ΔP"), and the specific gravity ("SG") of the fluid may be identified in terms of a flow coefficient ("$C_v$") for example by the following equation:

$$C_v = Q\sqrt{\frac{SG}{\Delta P}} \quad \text{Eqn. 1}$$

Figure 2:
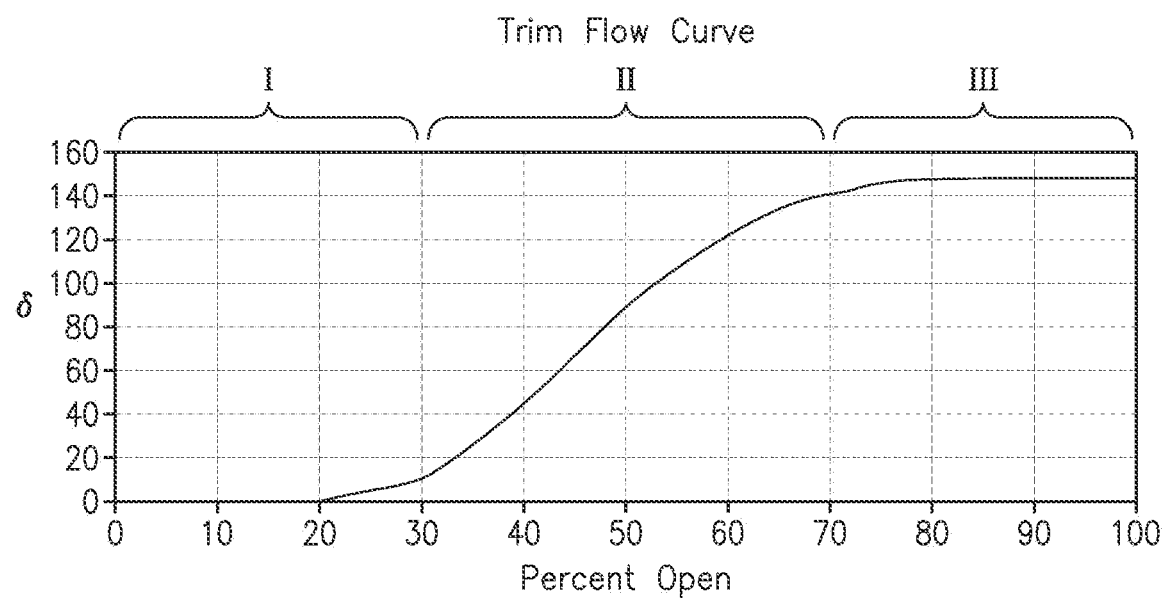
FIG. 2 is an exemplary choke valve trim flow curve having Cv values on a Y-axis and valve percent open (i.e., choke position) values on the X-axis.

The volumetric fluid flow ("Q") through the choke valve 28, the difference in pressure across the choke valve 28 ("ΔP"), and the specific gravity ("SG") of the fluid flowing through the choke valve 28 may be viewed as operational parameters; i.e., parameters dictated by the end use application of the choke valve 28. The flow coefficient Cv, on the other hand, may be viewed as a characteristic of the choke valve 28. Hence, the Cv value of a choke valve 28 may be used as a control parameter within an automated well drilling system 10 that controls well annular pressure using the choke valve 28. The relationship between the flow coefficient Cv of a choke valve 28 and the valve opening percentage (i.e., choke position) of the same choke valve 28 is typically unique to that particular model choke valve (e.g., a particular choke valve model produced by a particular manufacturer). Most choke valve manufacturers provide the choke valve user with a mathematical expression, or a graphical expression, or both, indicating the relationship between Cv and the opening percentage of the choke valve. FIG. 2 illustrates a trim flow curve having Cv values on a Y-axis and valve percent open on the X-axis.

The controller 24 includes any type of computing device, computational circuit, or any type of process or processing circuit capable of executing a series of instructions that are stored in memory, including instructions for accomplishing tasks associated with the methodologies described herein. For example, the controller 24 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the choke valve(s) 28, and the stored instructions are not limited to any particular form (e.g., program files, system data, buffers, drivers, utilities, system programs, etc.) provided they can be executed by the controller 24. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 24 may be achieved via the use of hardware, software, firmware, or any combination thereof. The controller 24 may include one or more input devices (e.g., a keyboard, a touch screen, communication input ports, terminals, wireless communication devices, sensors, etc.) and/or one or more output devices (a monitor, data readouts, communication output ports, terminals, wireless communication devices, sensors, etc.) that enable signals and/or communications to be sent to and/or provided from the controller 24.

The controller 24 may have a single human machine interface ("HMI") control station or may be in communication with a plurality of HMI control stations (each of which may include one or more computing devices, computational circuits, or any type of process or processing circuit capable of executing instructions that are stored in memory, as described above) that permit an operator to input instructions into the controller 24, and/or to receive output from the controller 24. The controller 24 and/or the control station(s) may be in communication with various different well rig operational components (e.g., valves, pressure sensors, temperature sensors, manifolds, mud pumps, a rig air sources, hydraulic power units, various different manifolds, fluid reservoirs, mud pump systems, etc.), and other well operation components that are useful in performing the methodological functions described herein.

Communications between the controller 24 and the choke valve manifold 22 and other well rig components may be accomplished via hardwire or by wireless communication devices. The present disclosure is not limited to any particular communications protocols, standards, etc.; e.g., profinet, TCP/IP, Modbus, etc. In some embodiments, the system may include one or more dedicated communication channels, and/or may include structure for shared channels (potentially as part of a multiplexing scheme or bus architecture). A channel may be used to transmit and/or receive power signals, data signals, communications, etc.

As stated above, one of the main challenges related to well drilling is to maintain the annular pressure in the well (e.g., the BHP) within a pressure window; i.e., between the fracture pressure ("$P_F$") and the pore pressure ("$P_P$"); e.g., (i.e., $P_P$<BHP<$P_F$). There are numerous known techniques for maintaining the annular pressure between the pore and fractures pressures during drilling, including but not limited to managed pressure drilling ("MPD"). There are several different known types of MPD; e.g., Constant Bottom Hole Pressure ("CBHP"), Pressurized Mud Cap ("PMCD"), Dual Gradient ("DG"), etc. The present disclosure has utility for a variety of different well drilling pressure management techniques, and therefore is not limited to any particular well drilling pressure management technique. To illustrate the present disclosure, the present disclosure will be described as part of a MPD system.

As stated above, during drilling operations, a rotating drill may be used to penetrate a formation (e.g., a seabed) and thereby create well. While drilling, a drilling fluid (commonly referred to as "mud") is pumped from a reservoir (e.g., the "mud tank 20") into the drillstring 14 to the bottom of the well where it facilitates the drilling process. The mud (and debris created during the drilling process, and in some instances well fluids produced during the drilling process) is returned to the surface through the annulus 26 surrounding the drillstring 14. The returning mud is directed through the choke manifold 22 and is directed to the mud tank 20. Prior to the returning mud entering the mud tank 20, the returning mud is typically subjected to separation processes wherein constituents (i.e., debris, well fluid, etc.) other than the original mud are removed.

The controller 24 is configured (e.g., with stored instructions) that include the Cv values of the choke valve 28 as a function of the degree to which the choke valve 28 is open between a fully closed position to a completely open position (i.e., 0-100%). Hence, once the current Cv value of the choke valve 28 is known, the current position of the choke valve 28 (e.g., percent open of the choke valve) is known. The stored instructions relating Cv values to choke positions may be in a variety of different forms; e.g., in the form of one or more mathematical functions, a lookup table, a graphical depiction, or any combination thereof.

In some embodiments, the controller 24 is configured to receive a volumetric fluid flow ("Q") value representative of the fluid flow through the choke valve 28. The volumetric fluid flow rate may be based on the output of a pump (e.g., the mud pump 18) that feeds fluid into the closed loop system from the mud tank 20, or based on feedback from a flow meter, or some combination thereof. The present disclosure is not limited to any particular mechanism for providing a value representative of the fluid flow through the choke valve 28. In some embodiments, the well drilling system 10 may be configured to sense and/or determine the fluid flow rate entering the well and the fluid flow rate exiting the well. The two fluid flow rate values may be compared. In some embodiments, if the fluid flow rate values differ from one another outside of a beyond predetermined error range (which error may be indicative of a kick or losses), then corrective action may be taken so that the compared fluid flow rates are again within the predetermined error margin.

In some embodiments, the controller 24 is configured to receive a specific gravity value ("SG") of the fluid flowing through the choke valve 28. The specific gravity value may be an input value, or may be a determined value, or some combination thereof. For example, typically the mud utilized within a given well drilling operation is chosen by the well drilling operator, and the properties of the mud (e.g., the specific gravity of the mud) are known and can be input into the controller 24 by the operator. In some instances, the mud may be sensed by a device such as a density meter or a mass flow meter and the specific gravity determined therefrom. The present disclosure is not limited to any particular mechanism for providing a specific gravity value for the fluid traveling through the choke valve.

In some embodiments, the controller 24 is configured to receive a set point annular pressure ("$P_{SP}$") from the operator (i.e., an input value). The set point annular pressure $P_{SP}$ is a fluid pressure value selected by the user to reflect an annular pressure during the drilling operation that is between the fracture pressure and the pore pressure. The controller 24 is also configured to receive a pressure ("$P_{DS}$") value representative of mud flow downstream of the control valve (i.e., an input value). The downstream pressure value $P_{DS}$ may be equivalent to atmospheric pressure, or a known difference from atmospheric (e.g., an amount different attributable to known pipe losses). The controller 24 may be configured to determine a difference between the set point annular and the downstream pressure (i.e., $\Delta P = P_{SP} - P_{DS}$). Alternatively, the $\Delta P$ value may be input into the controller 24.

With the given volumetric fluid flow value (Q), specific gravity value (SG), and the determined (or input) difference between the set point pressure and the downstream pressure ($\Delta P$), the flow coefficient value (Cv) for the choke valve 28 may be determined by the controller 24 (via stored instructions; e.g., including using Eqn. 1 or similar equation). The controller 24 is further configured to identify/determine the choke position value (i.e., the choke valve percent open) from the stored instructions that relate the Cv value of the choke valve 28 to the choke valve position. Hence, with the Q, SG, and $\Delta P$ values, the controller 24 is configured to determine the appropriate choke position to achieve the set point annular pressure within the well. The description above gives an example of how the choke position for a desired set point annular pressure may be determined from Eqn. 1, and Q, SG, and $\Delta P$ values. The present disclosure is not limited to Eqn. 1, and alternative algorithmic approaches that relate the Cv value and choke position to a desired set point annular pressure value may be used alternatively.

During operation of the drilling well system, the operator may elect to change the set point annular pressure within the well. For example, the well operator may be drilling a well understood to have a pressure window like that diagrammatically shown in FIG. 3. The pressure window diagrammatically shown in FIG. 3 includes depth shown along the Y-axis, wherein the depth increases in the direction toward the intersection with the X-axis, and annular well pressure (e.g., BHP) along the X-axis, wherein the pressure increases in the direction away from the intersection with the Y-axis. The aforesaid pressure window may be based on information gained from similar wells, or from experience, etc. At certain well depths, the drilling window may expand or contract, and the operator may elect to change the set point annular pressure in view thereof. Under embodiments of the present disclosure, once the operator has selected a new set point annular pressure, and assuming the volumetric fluid flow value (i.e., the mud volumetric flow value-Q) and the specific gravity value (SG) of the fluid have not changed, then the controller 24 is configured (via the stored instructions) to determine a new flow coefficient value (Cv) for the choke valve 28. Once the new Cv value is determined, the controller 24 is further configured to identify/determine the choke position (i.e., the choke valve percent open) from the stored instructions that relate the Cv value of the choke valve 28 to the choke valve position. The controller 24 then directly or indirectly controls the choke valve 28 to the new choke position and within a very short period of time, the well annular pressure migrates to the new selected set point annular pressure.

The above described embodiments of the present disclosure (which may be described as an "autotuning" type well control system) are in contrast to, and an improvement over prior art systems that utilize an iterative approach to annular pressure change. As stated above, many prior art control systems utilize an iterative process, wherein the choke position of a choke valve is iteratively translated to effectuate an annular pressure change within the well; e.g., change the choke position some defined amount, and then determine the change in annular pressure within the well. The process is repeated iteratively until the desired annular pressure is achieved. Embodiments of the present disclosure avoid the iterative process (and the time it takes) by determining the appropriate Cv and choke position for the desired set point annular pressure, and then adjust the choke position to achieve the desired set point annular pressure.

In some instances, the well operator may elect to change the fluid flow rate (Q) through the well (and therefore through the choke valve) and/or change the type of drilling fluid (i.e., the mud) being used in the drilling process, which new drilling fluid will likely have a different specific gravity (SG). In such instances, the change in fluid flow rate or in fluid specific gravity will have an effect on the annular pressure within the well. Under embodiments of the present disclosure, once the controller 24 receives the new Q value and/or SG value, then the controller 24 is configured to determine what if any change needs to be made to the choke position to maintain the desired set point annular pressure. For example, the controller 24 may be configured (via stored instructions) to determine a new Cv value based on the new Q value and/or SG value. As described above, once the new Cv value is determined, the controller 24 is further configured to identify/determine the choke position (i.e., the choke valve percent open) from the stored instructions that relate the Cv value of the choke valve 28 to the choke valve position. The controller 24 then directly or indirectly controls the choke valve 28 to the new choke position and within a very short period of time, the well annular pressure migrates to the new selected set point annular pressure.

As stated above, embodiments of the present disclosure may include a single adjustable orifice choke valve 28 (e.g., FIG. 1A), or two adjustable orifice choke valves 28A, 28B (e.g., as shown in FIG. 1B), or more than two adjustable orifice choke valves 28. In some embodiments of the present disclosure, all or a plurality of the adjustable orifice choke valves 28 may be controlled in the manner described above. To illustrate, a two adjustable orifice choke valve system (i.e., first choke valve 28A and second choke valve 28B as shown in FIG. 1B) will be described. In this example, the controller 24 is configured (e.g., with stored instructions) that include the Cv values of the first choke valve 28 as a function of the degree to which the first choke valve 28 is open (i.e., the choke position of the first choke valve 28A), and the Cv values of the second control valve 28B as a function of the degree to which the second choke valve 28B is open (i.e., the choke position of the second choke valve 28B).

Embodiments of the present disclosure that include a plurality of adjustable choke values 28 may provide the well drilling system 10 with a greater ability to accommodate a greater number of well drilling scenarios. For example, in some instances, the well operator may select some combination of fluid flow (Q), fluid specific gravity (SG), and set point pressure (that is used to determine the ΔP) values, that lead to a Cv value that is not attainable by the first choke valve 28A; the settings require a choke valve fluid flow that is beyond the full capacity (i.e., 100%) of the first choke valve 28A. In such an instance, the controller 24 may be configured (via stored instructions) to actuate the second choke valve 28B (which is deployed in parallel with the first choke valve 28A) to an open position to attain the fluid flow and other parameters that are required to achieve the set point annular pressure desired. The controller 24 may be configured, for example, to determine the difference in pressure across and the volumetric rate through the first choke valve 28A in its completely open state, and then subsequently determine the Cv value (and associated choke position) of the second control valve 28B necessary to achieve the well set point annular pressure while the first and second choke valves 28A, 28B are operating in parallel. Once the appropriate Cv value for the second choke valve 28B is determined, the controller may be configured to then control the will second choke valve 28B to move to that new calculated choke position.

Another instance wherein multiple choke valve embodiments of the present disclosure may provide the well drilling system 10 with additional capability are those wherein a choke valve 28 becomes plugged or otherwise inoperable. In such instances, the controller 24 may be configured to determine what if any fluid flow is passing through the affected choke valve 28 (e.g., the first choke 28A), and then determine a Cv value (and associated choke position) for the other choke valve 28 (e.g., the second choke valve 28B) in the manner described herein and subsequently control the other control valve to move to that new calculated choke position to enable the well drilling system 10 to operate at the desired set point annular pressure.

Another instance wherein multiple choke valve embodiments of the present disclosure may provide the well drilling system 10 with additional capability involve a sudden change (e.g., a spike) in annular pressure. Defining the limits of a well pressure window is not an exact science. Hence, from time to time during a drilling operation the annular pressure within the well may suddenly change. In those instances wherein the annular pressure suddenly increases (i.e., a spike), the controller 24 may be configured to detect the sudden increase in annular pressure and based thereon control the second choke valve 28B to act as a relief valve; e.g., quickly opening to a Cv value (and associated choke position) based on the pressure spike to immediately bring down the annular pressure within an acceptable range. Once the pressure spike is managed and the annular pressure returned to an acceptable value, the controller 24 may be configured to control the first and second control valves 28A, 28B in a preferred manner; e.g., as conditions permit, transition the choke operation from both the first and second choke valves 28A, 28B to the first choke valve 28A alone, and return the second choke valve 28B to a closed choke position.

As can be seen in FIG. 2, in many instances an adjustable orifice choke valve 28 will have a Cv/choke position relationship that varies between choke open and choke closed. The graphic depiction of Cv versus choke position shown in FIG. 2 is illustrative. In some regions of the curve (e.g., regions I and III), the choke valve 28 may have a constant Cv value for a substantial number of choke positions; e.g., in FIG. 2, the choke valve 28 has a Cv value of about zero associated with choke open positions between about zero and twenty percent (i.e., Cv=0 for 0-20% open), and the choke valve 28 has a Cv value of about 145 associated with choke open positions between about seventy-five and one hundred percent (i.e., Cv=145 for 75-100% open). In contrast, in region II (i.e., Cv values in the range of about between 30 and 70), appreciable changes in Cv are associated with appreciable changes in choke position. In region II, therefore, the choke valve 28 may be described as providing desirable controllability with respect to well annular pressure. In regions I and II, in contrast, changing the choke position has little or no effect on the Cv value and the choke valve 28 may be described as providing limited controllability with respect to well annular pressure.

In embodiments of the present disclosure that utilize a plurality of adjustable orifice choke valves 28, the controller 24 may be configured to utilize the first choke valve 28A within the region of the first choke valve Cv/choke position curve where the first choke valve 28A provides desirable well annular pressure controllability, and then actuate the second choke valve 28B to control fluid flow thereafter. For example and using the Cv/choke position curve shown in FIG. 2, the controller 24 may be configured (via stored instructions) to operate the first choke valve 28A to accommodate desired set point annular pressures for those Cv values within a desired region of the Cv curve (i.e., within region II), and maintain the second control valve 28B in a closed configuration. If a desired set point annular pressure is determined to have a Cv value outside of the desired region of the Cv curve (e.g., region I or III) for the first choke valve 28A, then the controller 24 may be configured to determine an appropriate Cv value (and associated choke position) for the second choke valve 28B, and then actuate the second choke valve 28B to the appropriate choke position. Thereafter, the first and second choke valves 28A, 28B will collectively produce the desired set point annular pressure. If after both control valves 28A, 28B are actuated to an open configuration, a new desired set point pressure is determined that can be accommodated by the first choke valve 28A alone, then the controller 24 may be configured to coordinate the respective choke positions of the first and second choke valves 28A, 28B to accomplish a smooth transition back to flow control by the first choke valve 28A alone.

Figure 3:
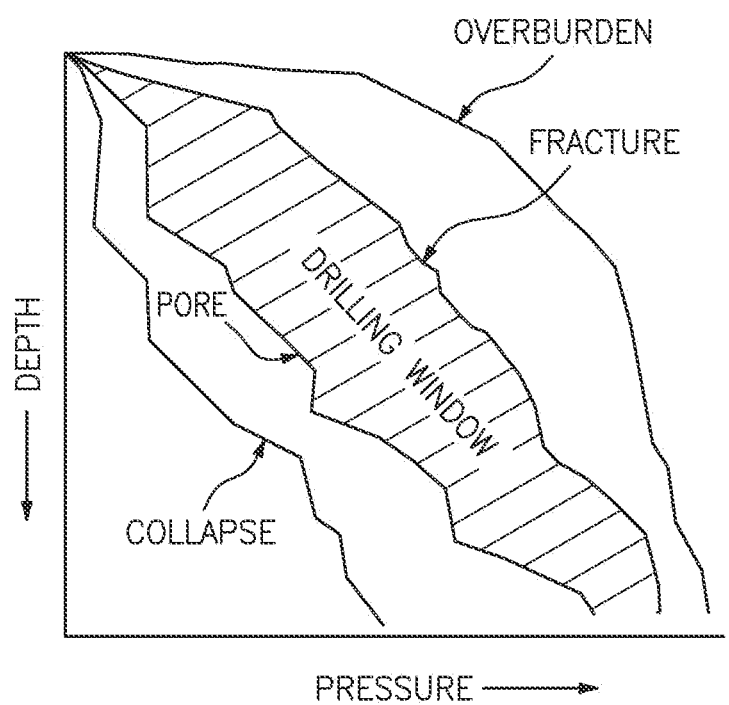
FIG. 3 is a diagrammatic representation of a pressure window that well depth along the Y-axis and annular well pressure along the X-axis.

In some embodiments of the present disclosure, the controller 24 may be configured to control actuation of a choke valve 28 based on the relationship between Cv values and choke position of that particular choke valve 28. As discussed above, in many instances an adjustable orifice choke valve will have a Cv/choke position relationship (e.g., curve) that varies, and includes some regions (e.g., region II as shown in FIG. 3) where the choke valve 28 may be described as providing desirable controllability, and other regions wherein the choke valve 28 may be described as providing limited controllability. The controllability of a choke valve 28 may also be viewed in terms of sensitivity. For example, in many instances a Cv/choke position curve may have regions where a slight change in one variable is associated with a substantial change in the opposite variable. In these curve regions, the choke valve 28 may be viewed as having a relatively high degree of sensitivity. In other instances, a Cv/choke position curve may have regions where an amount of change in one variable results in a change in the opposite variable that is not appreciably different in magnitude. In these curve regions, the choke valve 28 may be viewed as having a relatively low degree of sensitivity. In some embodiments of the present disclosure the controller 24 may be configured to account for the degree of choke valve sensitivity when actuating the choke valve 28. For example, if a set point annular pressure is desired that requires a change in the choke position, the controller 24 may determine the sensitivity of the choke valve 28 in the region of the Cv curve associated with the desired choke position. If the region has a relatively high sensitivity, the controller 24 may choose an appropriate choke valve actuation speed to ensure the choke valve 28 does not overshoot the target choke position. If, on the other hand, the region associated with the desired choke position has a relatively low sensitivity, the controller 24 may choose a faster choke valve actuation speed to accelerate the choke position change process since the possibility of an overshoot is less given the relatively low sensitivity of the choke valve 28 in that position of the Cv curve.

Still further, during operation of a well drilling system according to the present disclosure, the actuation of a choke valve 28 from a first choke position to a second choke position (i.e., from a first Cv to a second Cv) may involve traversing the valve portion of the choke valve 28 through different portions of the Cv/choke position curve, and those different portions may have different sensitivities. For example, the actuation of a choke valve 28 from a first choke position to a second choke position may require translation through a first portion of the Cv/choke position curve (low sensitivity) and into a second portion of the curve (high sensitivity). In this example, the controller 24 may be configured to control the choke valve 28 to actuate at a first speed within the first curve portion having a low sensitivity, and then control the choke valve 28 to actuate at a second speed (slower than the first speed) within the second curve portion having a relatively higher sensitivity.

In some embodiments, the controller 24 may be configured (e.g., via stored instructions) to decrease the actuation speed of the control valve (e.g., to ramp down the actuation speed) as the choke valve approaches the target Cv value (and associated choke position). This "ramp down" control aspect is in contrast to the iterative process of the prior art.

In some instances, the controller 24 may be configured to account for the travel characteristics of the valve portion of the choke valve 28; e.g., if a dynamic portion of a choke valve 28 is known to have a particular amount of inertia, then that inertia can be accounted for by the controller 24 to increase the accuracy of the change in choke position.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A well drilling system, comprising:
a choke manifold including a first choke valve, the first choke valve actuable in an open choke position, a closed choke position, and a plurality of different choke positions therebetween, wherein the first choke valve has a first flow coefficient (Cv) value for each choke position;
wherein the plurality of different choke positions of the first choke valve include a first set of first choke positions associated with respective first Cv values and a second set of first choke positions associated with respective first Cv values, wherein the first set has a high sensitivity defined by first rates of change between first choke position values and associated first Cv values within the first set, and wherein the second set has a low sensitivity defined by second rates of change between the first choke position values and the associated first Cv values within the second set, wherein the second rates of change are less than the first rates of change; and
a controller in communication with the first choke valve and a non-transitory memory storing instructions including a first set of instructions relating the first Cv values to the first choke position values for the first choke valve, the instructions when executed cause the controller to:
determine a first difference in pressure ($\Delta P1$) between a set point annular pressure and a second fluid pressure at a position downstream of the first choke valve;
input or determine a value representative of a density of a drilling fluid;
input or determine a first value representative of a volumetric fluid flow (Q1) through the first choke valve;
determine a selected first Cv value using the $\Delta P1$, the value representative of the density of the drilling fluid, and the first value representative of the volumetric fluid flow (Q1);
determine if the selected first Cv value is associated with a first choke position within the first set having the high sensitivity or within the second set having the low sensitivity;
actuate, when the first choke position associated with the selected first Cv value is within the first set, the first choke valve to the first choke position using a low first choke valve activation speed; and
actuate, when the first choke position associated with the selected first Cv value is within the second set, the first choke valve to the first choke position using a high first choke activation speed, wherein the high first choke activation speed is greater than the low first choke valve activation speed.

2. The system of claim 1, wherein the instructions relating the first Cv values to the first choke positions include at least one of one or more mathematical functions or a lookup table.

3. The system of claim 1, wherein the Q1 value is based on input to the controller from at least one of a volumetric fluid flow output from a pump, or signals from at least one flow meter, or some combination thereof.

4. The system of claim 1, wherein the value representative of the density of the drilling fluid is a specific gravity value (SG) of the drilling fluid, and the SG value is based on input to the controller from an operator or based on input to the controller from one or more devices sensing the drilling fluid.

5. The system of claim 1, wherein the choke manifold further includes a second choke valve, the second choke valve actuable in an open choke position, a closed choke position, and a plurality of different choke positions therebetween, wherein the second choke valve has a second Cv value for each choke position;
and wherein the instructions further include a second set of instructions relating the second Cv values to the second choke position values for the second choke valve;
the instructions when executed further causing the controller to:
determine a second difference in pressure ($\Delta P2$) between the set point annular pressure and a third fluid pressure at a position downstream of the second choke valve;
input or determine a second value representative of a volumetric fluid flow (Q2) through the second choke valve;
determine a selected second Cv value using the $\Delta P2$, the value representative of the density of the drilling fluid, and the second value representative of the volumetric fluid flow (Q2); and
actuate the second choke valve to the second choke position associated with the selected second Cv value.

6. The system of claim 5, wherein the plurality of different choke positions of the second choke valve include a first set of second choke positions associated with respective second Cv values and a second set of second choke positions associated with respective second Cv values, wherein the first set has a high sensitivity defined by third rates of change between second choke position values and associated second Cv values within the first set, and wherein the second set has a low sensitivity defined by fourth rates of change between the second choke position values and the associated second Cv values within the second set, wherein the fourth rates of change are less than the third rates of change; and
the instructions when executed further causing the controller to:
determine if the selected second Cv value is associated with a second choke position within the first set having the high sensitivity or within the second set having the low sensitivity;
actuate, when the second choke position associated with the selected second Cv value is within the first set, the second choke valve to the second choke position using a low second choke valve activation speed; and
actuate, when the second choke position associated with the selected second Cv value is within the second set, the second choke valve to the second choke position using a high second choke activation speed, wherein the high second choke activation speed is greater than the low second choke valve activation speed.

7. A method for controlling annular fluid pressure of a drilling fluid within a well, the drilling fluid having a density, the method comprising:
(a) providing a choke manifold including a first choke valve, the first choke valve actuable in an open choke position, a closed choke position, and a plurality of different choke positions therebetween, wherein the first choke valve has a first flow coefficient (Cv) value for each choke position, wherein the plurality of different choke positions of the first choke valve include a first set of first choke positions associated with respective first Cv values and a second set of first choke positions associated with respective first Cv values, wherein the first set has a high sensitivity defined by first rates of change between first choke position values and associated first Cv values within the first set, and wherein the second set has a low sensitivity defined by second rates of change between the first choke position values and the associated first Cv values within the second set, wherein the second rates of change are less than the first rates of change;

(b) providing a controller in communication with the first choke valve and a non-transitory memory storing instructions including a first set of instructions relating the first Cv values to the first choke position values for the first choke valve;

(c) determining a first difference in pressure ($\Delta P1$) between a set point annular pressure and a second fluid pressure at a position downstream of the first choke valve;

(d) inputting or determining a value representative of the density of the drilling fluid;

(e) inputting or determining a first value representative of a volumetric fluid flow (Q1) through the first choke valve;

(f) using the controller to determine a selected first Cv value using the AM, the value representative of the density of the drilling fluid, and the first value representative of the volumetric fluid flow (Q1);

(g) using the controller to determine if the selected first Cv value is associated with a first choke position within the first set having the high sensitivity or within the second set having the low sensitivity;

(h) actuating, when the first choke position associated with the selected first Cv value is within the first set, the first choke valve to the first choke position using a low first choke valve activation speed; and (i) actuating, when the first choke position associated with the selected first Cv value is within the second set, the first choke valve to the first choke position using a high first choke activation speed, wherein the high first choke activation speed is greater than the low first choke valve activation speed.

\* \* \* \* \*